Figures 1, 2:
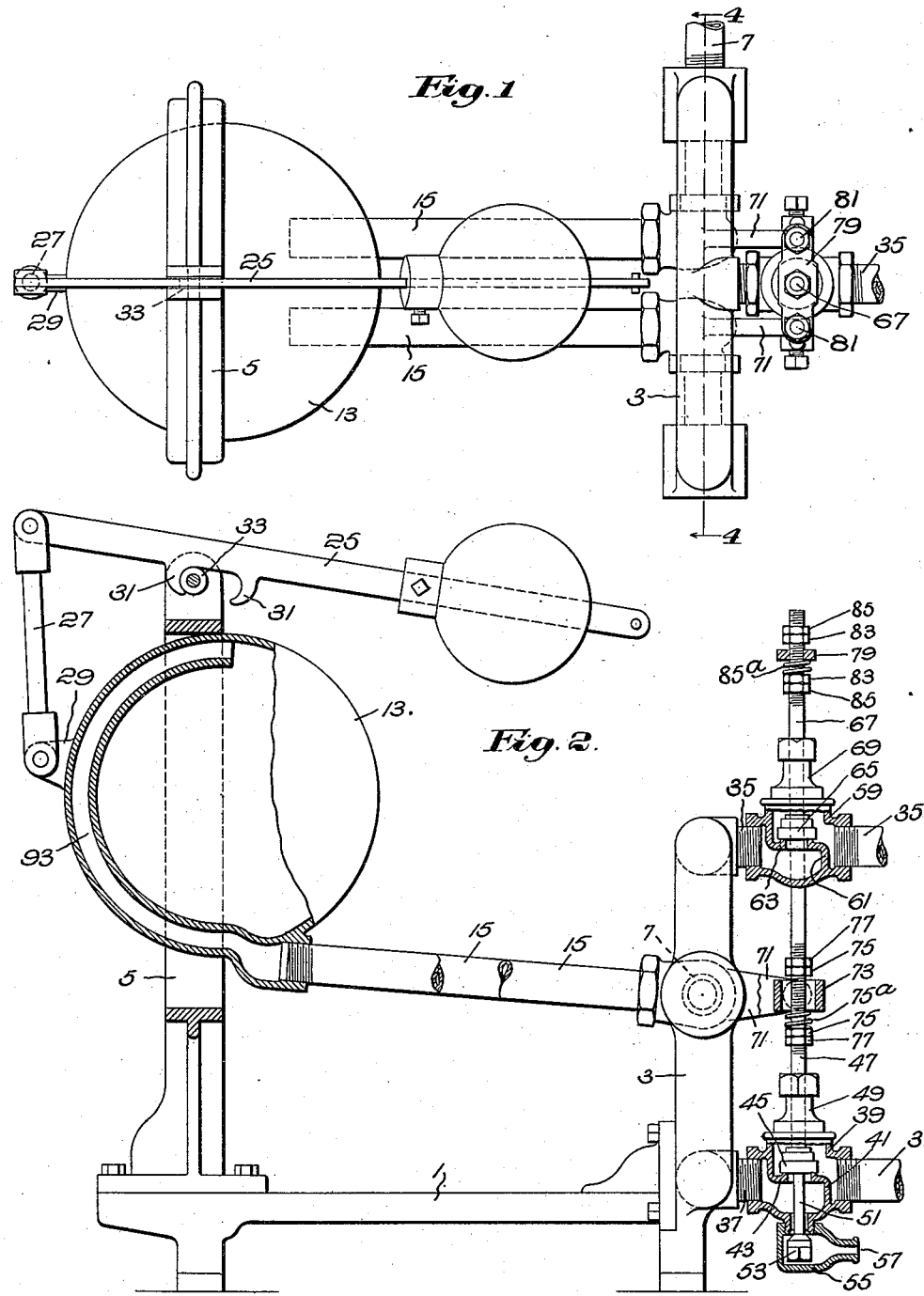

F. A. LITTLEFIELD.
STEAM TRAP.
APPLICATION FILED OCT. 24, 1912.

1,153,125.

Patented Sept. 7, 1915.
2 SHEETS—SHEET 1.

Witnesses:
Carl L. Choate.
Horace A. Crossman.

Inventor:
Frank A. Littlefield
by Emery, Booth, Janney & Varney
Attys.

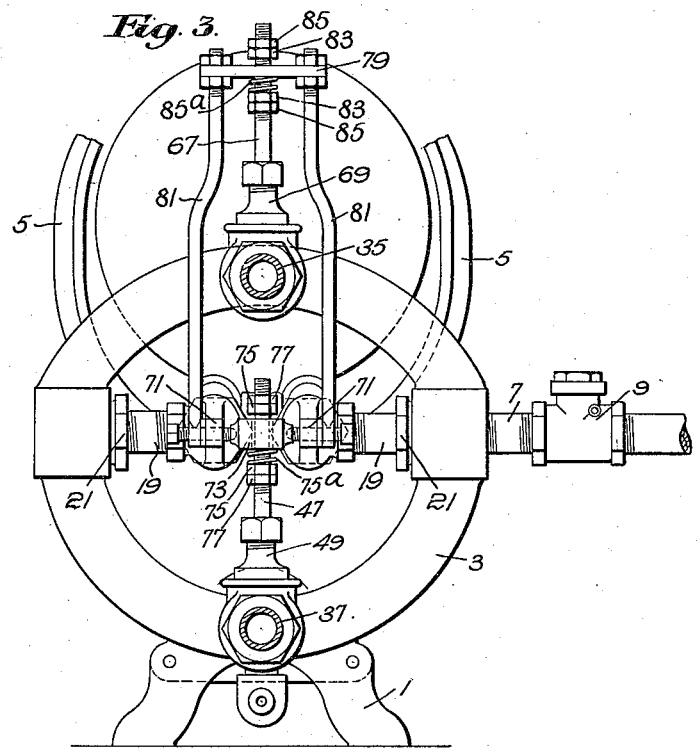
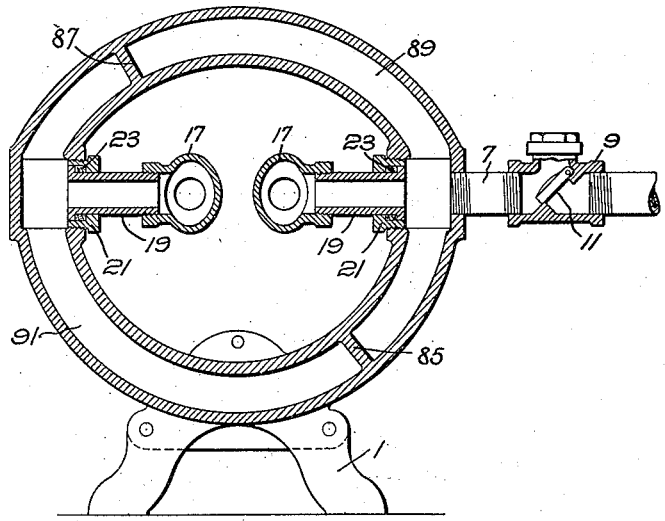

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP.

1,153,125.  Specification of Letters Patent.  Patented Sept. 7, 1915.

Application filed October 24, 1912. Serial No. 727,498.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps, of which the following description, in connection with the accompanying drawings, is a specification, like characters on the drawings representing like parts.

This invention relates to steam traps, and among other objects provides a simple and effective construction and mode of operation.

The character of the invention may be best understood by reference to an illustrative embodiment thereof shown in the accompanying drawings, wherein:

Figure 1 is a plan view of an illustrative steam trap embodying the invention; Fig. 2 is a side elevation partly in section on a vertical median plane of the trap shown in Fig. 1; Fig. 3 is an end elevation of the construction shown in Fig. 1, parts being broken away; and Fig. 4 is a vertical section taken on line 4—4 of Fig. 1.

Referring to the drawings, the illustrative steam trap there shown as embodying the invention comprises a frame including a tripod 1 for supporting the various parts of the trap and rings 3 and 5 rising from said tripod adjacent opposite ends thereof. The ring 3 is hollow and has connected therewith a feed pipe 7 provided with a valve body 9 containing a check valve 11. A bowl or receiver 13 is provided having a pair of tubes 15, 15 connecting said bowl with elbow tubes 17, 17 having trunnion tubes 19, 19 journaled in bearings 21, 21 threaded into the hollow frame ring 3 referred to. By this arrangement the bowl 13 may tilt for filling and after emptying the same. The trunnion tubes 19, 19 and bearings 21, 21 are provided with flanges between which are confined packing rings 23. The steam pressure within the hollow ring will tend to thrust the trunnion tubes 19, 19 toward one another and maintain the flanges and packing in tight contact.

The tilting of the bowl 13 is preferably governed by means of a weighted lever 25 connected by a link 27 with an ear 29 on the bowl 13. In the particular form of weighted lever and link connection shown the operation of the trap is rendered desirably prompt and actively-responsive to predetermined conditions of water in the bowl 13 by an arrangement of leverage changing device consisting of an elongated bearing for the lever 25 formed by fingers 31 projecting from said lever and forming between them a bearing engaging a roller 33 on the frame. When the bowl 13 is in its up position, as shown in Fig. 2, the left finger 31 engages the roller 33. When the bowl tilts downward the rocking of the lever 25 will lift the weight thereon and cause the lever to slide in the direction of its length to bring its other finger 31 against the roller 33, thereby increasing the effective leverage of the bowl 13 on the lever weight.

A discharge pipe 35 is connected to the hollow ring 3 preferably at the top thereof and a live steam pipe 37 is connected to said hollow ring preferably adjacent the bottom thereof. To control the live steam a valve is provided for the pipe 37 comprising a valve body 39 having a partition 41 therein formed to provide a valve seat 43. Coöperating with this seat is a valve disk 45 on a valve stem 47 projecting up through a valve bonnet 49.

The live steam controlling valve 45 has a stem 51 depending therefrom through an opening in the base of the valve body 39 which may be closed and opened by a valve 53 carried by said stem. This valve may be inclosed by a chamber 55 having a discharge nozzle 57. By this construction, when the steam valve is closed the valve 53 is opened and permits the escape of air from the bowl 13 as more fully hereinafter described.

Hitherto, so far as I am aware, it has been customary to provide the outlet with a weighted check valve, the weight on which would be sufficient to prevent a discharge from the bowl through the outlet pipe from the pressure on the feed pipe into the receiver. This weighted check valve was only sufficient to resist small pressures, since it would not be practical to increase the size of the weight and valve parts sufficiently to take care of high pressures. Furthermore, to discharge the bowl it was necessary to have a live steam pressure higher than that afforded by the weighted valve in order to overcome the same and effect a discharge therethrough.

To provide an outlet control which will be independent of the pressure conditions in the receiver or of the live steam, I will now describe a valve arrangement for controlling the outlet discharge. To this end a valve body 59 is threaded or otherwise secured to the outlet pipe 35. Said valve body is provided with a partition 61 formed to provide a valve seat 63 with which coöperates a valve disk 65. This valve disk is carried by a valve stem 67 projecting up through a bonnet 69.

In order that the accumulated water in the bowl may be utilized to control the steam and discharge valves they are operated by the movement of the bowl. To this end the elbow tubes 17, 17 referred to are provided with ears 71 projecting therefrom. These ears are apertured to receive journal ends of a cross-head 73 loosely receiving the steam valve stem 47. To transmit the tilting movement of the head 23 to said stem, the latter is provided with upper and lower nuts 75 and lock nuts 77 which may be adjusted as desired. Preferably the upper nuts are set somewhat above the head 73 in order to permit a slight play and enable the bowl to tilt somewhat before bringing the head 73 into engagement with the upper nut 75. By this arrangement the bowl acquires a certain momentum and effective force before it becomes active in lifting the steam valve 45 from its seat.

To transmit the tilting movement of the bowl to the discharge valve the stem 67 of the latter is provided with a cross-bar 79 loosely embracing said stem, said head being connected by rods 81 (Fig. 3) with ends of the journals of the cross head 73 referred to. To transmit the movement of the head 79 to the valve stem 67, upper and lower nuts 83 and lock nuts 85 are provided on said stem.

To yieldingly press the steam and discharge valves on their seats a helical spring 73ª may be interposed between the head 73 and the lower nut 75, and a helical spring 85ª may be interposed between the lower nut 83 and the cross-bar 79.

The hollow ring 3 may be provided with partitions 85 and 87, forming a duct 89 leading from one of the trunnion tubes 19 to the discharge pipe 35 and a duct 91 leading from the steam pipe 37 to the other trunnion tube 19.

The operation of the steam trap described is as follows. It may be supposed that the bowl 13 is in its up tilted position, being held there by its weighted lever 25. When in this position the steam valve disk 45 and the water discharge valve disk 65 are on their seats, thereby closing the bowl from communication with the steam and discharge pipes 35 and 37. Water of condensation is led past the check valve 11 through the pipe 7, through the right trunnion tube 19 (Fig. 4) and the tube 15 connected therewith into the bowl 13. When sufficient water accumulates in the bowl it will overcome the counterbalance weight and cause the bowl to tilt downward. This movement is accelerated by the automatic change in the leverage of the weighted lever 25 in sliding on its fulcrum roller 33. The initial tilt of the bowl rocks the head 73 up into engagement with the upper nut 75 on the steam valve stem 47, taking up the play between them. Further tilting of the bowl snatches the valve disk 45 quickly and positively from its seat and permits live steam to pass through the steam pipe 37, through the frame ring duct 91, thence through the left trunnion tube 19 (Fig. 4) and the tube 15 connected therewith into the bowl 13. To deliver the steam into the bowl a steam duct 93 (Fig. 2) may be cast in the wall of the bowl and present an outlet at the top of the bowl.

The upward rocking of the head 73, occasioned by the tilt of the bowl, not only opens the steam valve, but, operating through the connecting rods 81 and stem 67, snatches the discharge valve disk 65 quickly and positively from its seat. This permits the water, forced by the steam, to pass from the bowl, through the right tube 15 (Fig. 4) and the trunnion tube 19 connected therewith, thence through the frame ring duct 89 out of the discharge pipe 35.

The pressure of the steam in the live steam pipe tends to hold the steam valve disk 45 on its seat. As stated, in order that the bowl may not be called upon to perform the work of lifting both the steam and discharge valves simultaneously the upper nuts on the discharge valve stem are positioned thereon to provide a slight lost motion between the cross-bar 79 and the same before said bar comes into lifting engagement therewith. It will be understood, however, that this lost motion is so slight that under the quick rocking of the bowl both the steam and discharge valves are operated almost at the same instant.

After the water has been discharged from the bowl as described, the counterbalance weight tilts the same up again to its position shown in Fig. 2 and thereby closes the steam and discharge valves. The operations described above are automatically repeated each time sufficient water accumulates in the bowl.

To permit the escape of the steam from the bowl after discharge, the vent valve 53 is opened on the closing of the steam valve. While the steam valve is open the vent valve of course is closed.

By my invention is provided a simple and effective construction whereby the bowl contents may be quickly and readily discharged independently of the pressure on the discharge valve and independently of the pressure on the feed. The steam for effecting the discharge does not need to be sufficient to lift a weighted check valve before effecting the discharge, but merely sufficient to lift the water discharged the desired height. Thus the steam trap promptly and effectively discharges regardless of the pressure in the feed and throughout a wide range of live steam pressure.

While the steam trap described is intended more particularly as a lifting trap, obviously it can be used for other purposes.

So far as I am aware, I am the first to provide the discharge outlet with a valve operated by the accumulated water in the bowl or by the movement of the bowl.

It will be understood that the steam trap shown in the drawings is selected merely as one illustrative embodiment of the invention and that other embodiments may be made without departing from the spirit and scope of the invention.

What I claim as new and desire to secure by Letters Patent is:

1. A steam trap comprising in combination, a support including a hollow ring, a tilting bowl journaled on said ring and communicating therewith, steam inlet and discharge pipes connected to and communicating with said ring, valves for said steam and discharge pipes, means connecting said valves, and a member movable with said receiver for reciprocating said connecting means positively to open and close said valves.

2. A steam trap comprising in combination, a support, a tilting receiver fulcrumed thereon, steam inlet and condensation discharge pipes communicating with said receiver, valves for said pipes, stems for said valves, a member fixed to said receiver and movable therewith for operating said steam valve stem, and means fast to said member for operating said discharge valve stem.

3. A steam trap comprising in combination, a support, a tilting receiver fulcrumed thereon, steam inlet and condensation discharge pipes communicating with said receiver, valves for said pipes, means connecting said valves, and a single member projecting from said receiver and movable therewith for engaging said connecting means positively to open and close said valves.

4. A steam trap comprising in combination, a support, a tilting receiver fulcrumed thereon, steam inlet and condensation discharge pipes communicating with said receiver, valves for said pipes, means connecting said valves including a frame straddling said discharge pipe, and a member projecting from said receiver and movable therewith to reciprocate said frame and thereby open and close said valves.

5. A steam trap comprising in combination, a support including a hollow ring, a receiver fulcrumed on and communicating with said ring, feed, steam inlet and condensation discharge pipes connected to and communicating with said ring, a check valve for said feed pipe, valves for said steam and discharge pipes located substantially in vertical alinement, means including an operating member extending upward from one of said valves to the other, and an actuating member for said operating member fixed to and movable with said receiver.

6. A steam trap comprising in combination, a support, a tilting receiver fulcrumed thereon, steam inlet and condensation discharge pipes communicating with said receiver, valves for said pipes, a member projecting from said receiver and movable therewith, and means connecting said valves operated by said member and having provision for snatching first the steam valve from its seat and then the discharge valve from its seat.

7. A steam trap comprising in combination, a support, a tilting receiver fulcrumed thereon, steam inlet and condensation discharge pipes communicating with said receiver, valves for said pipes, stems for said valves, a cross head movable with said receiver and embracing the steam valve stem, abutments on said stem for engagement with said cross head, a second cross head embracing the discharge valve stem, abutments on the latter stem for engagement with said second cross head, and means connecting said cross heads.

8. A steam trap comprising in combination, a hollow receiver supporting ring, a solid counterweight supporting ring, a tilting receiver fulcrumed on and communicating with the hollow ring, a steam inlet pipe having a valve thereon communicating with the lower portion of the ring, a discharge pipe having a valve thereon communicating with the upper portion of the ring, a feed pipe communicating with the ring at substantially the fulcrumed point of the receiver thereon, means connecting the receiver with the steam inlet and discharge valves for operating the same whereby the steam valve is first opened by the movement of the receiver, and means connected with the receiver for accelerating the movement thereof for quickly snatching the discharge valve from its seat following the opening of the steam valve.

9. A steam trap comprising a tilting receiver, a discharge pipe leading therefrom and having a valve thereon, a steam pipe leading thereto and having a valve thereon, means connecting said valves, and means connecting the receiver with said valve-connecting means for operating the valves, and means for accelerating the movement of the receiver to snatch the discharge valve quickly from its seat; said means comprising a counterweight connected to the receiver and means for automatically changing the leverage of the weight upon movement of the receiver, to open the discharge valve.

In testimony whereof, I have signed my name to this specification, in the presence of two subscribing witnesses.

FRANK A. LITTLEFIELD

Witnesses:
JOHN R. SPRING,
MARSHALL D. CABLEIGH.

Copies of this patent may be obtained for five cents each, by addressing the "Commissioner of Patents, Washington, D. C."